United States Patent [19]
Chandler et al.

[11] 3,989,854
[45] Nov. 2, 1976

[54] CONTACTING CITRUS JUICE WITH A CELLULOSE ESTER ADSORBENT TO REMOVE LIMONIN

[75] Inventors: Bruce Veness Chandler, Chatswood; Robert Leonard Johnson, North Ryde, both of Australia

[73] Assignee: Commonwealth Scientific and Industrial Research Organization, Campbell, Australia

[22] Filed: Feb. 20, 1975

[21] Appl. No.: 551,292

[30] Foreign Application Priority Data
Feb. 21, 1974 Australia............................... 6670/74

[52] U.S. Cl.................................. 426/422; 426/442; 426/398; 426/599; 426/106
[51] Int. Cl.²........................................... A23L 2/00

[58] Field of Search........... 426/422, 424, 106, 124, 426/132, 415, 398, 397, 330.5, 599, 442

[56] References Cited
UNITED STATES PATENTS

| | | | |
|---|---|---|---|
| 1,619,016 | 3/1927 | Duclaux | 426/422 X |
| 2,816,033 | 12/1957 | Pritchett | 426/330 X |

*Primary Examiner*—Joseph M. Golian
*Attorney, Agent, or Firm*—Cushman, Darby & Cushman

[57] ABSTRACT

Fruit juices are debittered by removal of limonin therefrom using cellulose esters, such as cellulose acetate and/or cellulose acetate butyrate, as adsorbents. The juices can be treated either before or after packaging into containers.

14 Claims, No Drawings

CONTACTING CITRUS JUICE WITH A CELLULOSE ESTER ADSORBENT TO REMOVE LIMONIN

This invention relates to the treatment of fruit juices, particularly citrus fruit juices, to reduce the bitterness thereof by adsorption of bitterness principles in the juices.

Bitterness in citrus fruits and their products is due to limonoid principles, predominantly limonin, and/or flavonoid principles, predominantly naringin and neohesperidin. These principles have been discussed generally by J. F. Kefford and B. V. Chandler in Chapters 13 and 14 of "The Chemical Constituents of Citrus Fruits" (Academic Press — 1970).

The distribution of limonoid and flavonoid bitter principles varies from fruit to fruit. In sweet oranges, such as Navel oranges, the limonoids are generally dominant, but Seville oranges (used for marmalade) have a dominant flavonoid component. In lemons, limonoids are present with very little flavonoid component, whereas in grapefruit both are present, flavonoids being dominant in the fresh juice but limonoids being most important in the processed juice.

Briefly, limonoid bitterness is due to the presence of the dilactone limonin, a tetranortriterpenoid of formula $C_{26}H_{30}O_8$, which is initially present in the albedo of oranges but which passes into orange juice on standing or heating. At concentrations of 8–12 ppm, the juice becomes detectably bitter and in the paper "The Removal of Limonin from Bitter Orange Juice" by B. V. Chandler, J. F. Kefford and G. Ziemelis, in the Journal of the Science of Food and Agriculture, Vol. 19, No. 2, February 1968, pages 83–86, it is shown that removal of limonin can be effected by treatment of juice with polyamide powders. A two-stage treatment is found to be the most successful because the preferential adsorption of flavonoids, such as hesperidin, which contain phenolic groups, by polyamides interferes with the limonin removal in a single stage treatment. A major disadvantage of the polyamide adsorption process, however, is that the use of adsorbents in powder form requires the centrifugation of the juice to serum and pulp, the pulp being added back to the serum after the latter has been treated with the adsorbent. Moreover, a substantial amount of the ascorbic acid (vitamin C) in the orange juice is removed (up to 30 percent) and the two-stage treatment, although efficient, has obvious economic disadvantages.

The flavonoid bitterness is due to the presence of flavonoid neohesperiodosides (as distinct from rutinosides, which are substantially tasteless). Naringin, a flavonone neohesperiodoside, predominates in grapefruit, but is also present with neohesperidin, another neohesperidoside, in bitter oranges, such as Seville oranges. One of the most recent techniques for removing flavonoid bitterness, described in French Pat. No. 2,125,539 (to SNAM Progetti S.P.A.)., involves the use of enzymic action to convert naringin into non-bitter components. The enzyme preferred for this technique by inventors D. Dinelli and F. Morisi is naringinase incorporated into certain polymers as supports or carriers.

In general, and contrary to the statement made in the introduction of the aforementioned French Pat. No. 2,125,539, limonoid bitterness is the most important in processed citrus products.

It is an object of the present invention to provide a new technique for removing limonoid bitterness from fruit juices, particularly citrus fruit juices, in a one stage or continuous operation, without the attendant disadvantages of the polyamide adsorption process mentioned above, namely the need for a centrifugation step and the concurrent removal of large amounts of vitamin C from the juice.

To achieve this objective the present invention utilises the discovery that certain materials not previously noted as adsorbents, namely cellulose esters - including those suggested by D. Dinelli and F. Morisi as carriers for naringinase enzymes in the removal of flavonoid bitterness in French Pat. No. 2,215,539 — may be used successfully as adsorbents, especially for the removal of limonin from fruit juice and that this adsorption is more selective than that obtained with polyamide powders used hitherto, so that only small amounts of ascorbic acid are removed from the juice.

As a typical result flowing from this invention, Navel oranges, at present processed on a relatively small scale because of their high limonin content, can now be used in quantity for the preparation of orange juice, thus extending the orange juice processing period.

According to the present invention there is provided a method of removing limonin from fruit juice which comprises contacting the fruit juice with at least one cellulose ester adsorbent. Preferably, the cellulose ester adsorbent comprises cellulose acetate and/or cellulose acetate butyrate.

The term "fruit juice" as used throughout this description and the appended claims includes not only whole juice as extracted from the fruit, but also whole juice which has been further processed as by concentration, dilution, blending and the like, prior to treatment in accordance with the present invention. The term further encompasses such whole or processed juice which has been treated by the addition of preservatives, colouring and flavouring materials and similar materials used in the treatment of fruit juices.

The treatments included in the present invention may involve any of the conventional techniques used in adsorption processes.

The adsorbent according to this invention is preferably in the gel form, and is typically in a column. The gel is preferably in the form of beads large enough to be packed into columns and to allow whole juice to pass through beds of the beads in such columns without prior centrifugation. By way of example, beads of size 6.4 to 1.7 mm diameter have been found to provide effective contact between juice and adsorbent when packed in a column.

In this aspect, then, the present invention provides apparatus for the treatment of fruit juice comprising an adsorbent column containing or consisting of at least one cellulose ester adsorbent and means for passing fruit juice through said column.

In applying the present invention to, for example, orange juice utilising a column of adsorbent, the juice is extracted from the oranges using conventional equipment and screened to remove rag particles and cell sacs, again using conventional equipment. The juice is either flash pasteurized or stored chilled for 24 hours, then passed through a column of the adsorbent. Cloud particles, usually present in conventionally screened orange juice, pass through the column and are not lost from the juice. The juice may then be processed or treated for distribution and storage by conventional methods.

The use of cellulose ester gels in the column mode of operation is illustrated by the following example.

EXAMPLE 1

A glass tube (50.8 cm long × 3.2 cm i.d.) was packed with cubes of cellulose acetate butyrate gel (size range 12.7 – 6.4 mm; about 26 g dry weight of cellulose acetate butyrate). A very bitter orange juice containing 19.2 ppm limonin was passed through this column at an average flow rate of 2.5 ml/min. In this way 900 ml of a juice of barely detectable bitterness (limonin 8.8 ppm) was obtained.

As previously generally described, when the column mode of operation of the present invention is used it is preferable for the column to be formed of highly active gel beads of cellulose ester material. Briefly, these highly active beads may be prepared by forming, at an elevated temperature, a dispersion of a solution of the cellulose ester material in a liquid with which the solution is immiscible, cooling the dispersion and separating beads of the cellulose ester material from the liquid. In an alternative technique, these beads may be prepared by a "drop tower" technique which comprises forming a solution of the cellulose ester material and dropping the solution into a liquid with which the solution is immiscible.

The preparation and use of highly active gel beads of cellulose ester material in the column mode of operation is illustrated by the following example.

EXAMPLE 2

Cellulose acetate (6g) was dissolved in hot solvent (30 ml dimethyl formamide plus 13 ml water). The hot solution was then poured into petroleum oil (900 ml) at approximately the same temperature as the cellulose acetate solution. By stirring, the cellulose acetate solution was dispersed into globules. On cooling the dispersion (for example, by addition of water) the globules set to beads of cellulose acetate gel. 10 ml of "Teepol" detergent was added initially to the oil to prevent the globules from sticking to each other while setting was in progress. The gel beads were filtered from the oil, washed with detergent solution to remove adhering oil, and then soaked and washed with water to leach solvent out from the beads. Beads were obtained in the sizes; larger than 6.4 mm diameter, 1 ml; 6.4 – 1.7mm diameter, 40 ml; smaller than 1.7 mm diameter, 5 ml.

A glass column of 39 mm internal diameter and 150 cc bed volume (BV) was packed with the cellulose acetate (CA) beads (1.7 – 6.4 mm diameter). The weight of beads occupying the BV was 93g of which 16 g was CA and 77G was water, i.e. CA:water = 1:4.8. A bitter juice (A) with initial limonin content of 29 ppm and sugar content of 9.8° Brix was passed through a 0.02 in. screen to remove the coarser particles, and then passed upward through the gel bed at a rate of 2.1 BV/hr (5cc/min). Being less dense than the juice, the water contained in the beads tended to float as a layer on top of the juice and so pass as the initial effluent from the top of the column. After 1 BV had passed through the column, the Brix of the effluent was 8.7°, and after another BV, 9.8°. The first BV of effluent was discarded, and the following 7 bed volumes of effluent were collected, giving 1050cc of juice with an overall limonin content of 15.1 ppm. Thus a 48% reduction in limonin had been achieved at a juice throughput of 5cc/min. The limonin content of the effluent rose progressively during the run, from 13.6 ppm in the first BV collected to 16.6 in the last. A simple washing with 7BV of distilled water was sufficient to re-activate the gel bed before experimental runs with 2 other juices (B and C), which gave the results recorded in Table I below.

Table I

|  | Juice A | Juice B | Juice C |
|---|---|---|---|
| No. of bed volumes put through | 7 | 8 | 11 |
| Volume of juice treated (cc) | 1050 | 1200 | 1650 |
| Initial limonin content of juice (ppm) | 29.0 | 30.8 | 34.7 |
| Limonin content of first BV (ppm) | 13.6 | 11.6 | 8.8 |
| Limonin content of final BV (ppm) | 16.6 | 25.6 | 18.7 |
| Overall limonin content of effluent (ppm) | 15.1 | 18.4 | 15.0 |
| Limonin removal (%) | 48 | 40 | 57 |

While the gel beads of cellulose ester material are conveniently used in columns, they may also be utilised in batch operations. It has been found that these beads can be effectively used in batch treatments a number of times with their activity being regenerated between uses simply by soaking in water. The volume of water used for regeneration must be much greater than the volume of juice treated if the initial activity of the beads is to be restored fully. The beads may be conveniently enclosed in, for example, nylon mesh bags.

The use of gel beads of cellulose ester material in batch treatment of juice is illustrated in the following examples.

EXAMPLE 3

Table 2 below presents the results of three experiments in which cellulose acetate gel beads (CA:water = 1:5.6) were used to de-bitter orange juice by gently shaking the beads with juice for 45 minutes. It is noted that it may be desirable to take steps to prevent oxidative deterioration of juice during this process but it is not essential to the de-bittering treatment; the results reported in this Table were obtained in tests carried out in an atmosphere of nitrogen. Similarly, it is to be noted that it may also be desirable to carry out the process at reduced temperature; the results reported were obtained with juice at room temperature.

Table 2

|  | Expmt A | Mean from Expmt B&C |
|---|---|---|
| Wt. of beads/vol juice (g/100 ml) | 5.8 | 12.2 |
| Initial limonin content of juice (ppm) | 41.4 | 57.4 ± 1.8 |
| Final limonin content of juice (ppm) | 27.5 | 19.1 ± 1.9 |
| Limonin removal (%) | 34 | 63 – 70 |

EXAMPLE 4

In a further use of gel beads batchwise, nylon mesh bags were used to enclose CA gel beads (12.7 g of 3mm diameter beads with CA:water ratio of 1:5.6). The bags were shaken gently with 150 ml orange juice for 45 minutes under an atmosphere of nitrogen at room temperature (see Example 3 for comment on temperature and atmosphere conditions). After use, the bags were kept under 1% metabisulphite solution (150 mls) for a few days before the next run. Analyses of the limonin contents of the juices and wash waters are given in Table 3 for a series of 3 runs carried out in duplicate (mean results reported).

c. the gradual conversion of a juice of strong bitterness to one of slight bitterness using increasing amounts of cellulose acetate powder, and d. the complete de-bittering of a slightly bitter juice using very small amounts of cellulose acetate powder.

Table II

| Adsorbent powder Type | g/100 ml serum | Initial limonin (ppm) | Final limonin (ppm) | Initial Ascorbic Acid (mg/100 ml) | Final Ascorbic Acid (mg/100 ml) |
|---|---|---|---|---|---|
| (a) CAB | 2 | 15 | 7 | 47 | 46 |
| (b) CAB | 2 | 26 | 11 | 39 | 38 |
| (c) CA | 0.12 | 23.1 | 16.5 | — | — |
| (c) CA | 0.18 | 23.1 | 15.3 | — | — |
| (c) CA | 0.31 | 23.1 | 18.3 | — | — |
| (c) CA | 0.48 | 23.1 | 14.1 | — | — |
| (c) CA | 1.08 | 23.1 | 12.3 | — | — |
| (c) CA | 1.74 | 23.1 | 11.2 | — | — |
| (d) CA | 0.24 | 12.6 | 8.0 | — | — |
| (d) CA | 0.46 | 12.6 | 7.4 | — | — |
| (d) CA | 0.54 | 12.6 | 6.3 | — | — |

CAB: Cellulose acetate butyrate powder (Eastman EAB-381-20), unmoistened, 20 min gentle stirring
CA: Cellulose acetate powder (CSR Chemicals, BMF grade), 44–72 mesh, moistened with up to 2 ml of water, 45 min gentle stirring Table 3

| | Expmt A | Expmt B | Expmt C |
|---|---|---|---|
| Initial limonin content of juice (ppm) | 22.6 | 20.7 | 19.1 |
| Final limonin content of juice (ppm) | 12.7 | 13.5 | 15.2 |
| Limonin removal (%) | 44 | 35 | 20 |
| Amount of limonin removed (mg) | 1.485 | 1.080 | 0.585 |
| Limonin content of wash water (ppm) | 2.8 | 3.3 | 4.3 |
| Amount of limonin recovered (mg) | 0.420 | 0.495 | 0.645 |

In accordance with this invention, however, the cellulose ester adsorbent may also be used in a powder form for batch treatments of juice in a manner similar to the polyamide powder treatments referred to above. The cellulose ester powders possess the advantage that a one-stage treatment is quite adequate to de-bitter a bitter orange juice whereas a two stage treatment may be necessary with the polyamide powder treatment. One powder treatment consists of a preliminary centrifugation to remove components such as cloud particles and fine pulp from the juice serum. The serum is then shaken or stirred gently with premoistened cellulose ester powder adsorbent. Finally, the adsorbent powder is separated from the de-bittered serum which is then recombined with the other components of the juice.

The following Example demonstrates the removal of limonin from bitter juices using cellulose ester adsorbents in powder form.

EXAMPLE 5

A series of treatments of fruit juices is carried out in accordance with the general procedure described above using cellulose acetate or cellulose acetate butyrate adsorbents in powder form. The treatments and results obtained are tabulated in Table II which shows a. the complete de-bittering of a juice of moderate bitterness;

b. the conversion of a juice of strong bitterness to one of slight bitterness, both (a) and (b) without significant loss of ascorbic acid;

It will be clear to those skilled in this art that these results demonstrate that complete de-bittering can be obtained by using the required quantity of adsorbent, which depends on the initial bitterness of the juice.

The above-described powder treatment involves a preliminary centrifugation to separate the serum of the juice from the other components thereof, the serum then being contacted with adsorbent powder. In an alternative powder treatment, this preliminary centrifugation may be dispensed with if the cellulose ester powder is enclosed in, for example, bags of fine-mesh fabric such as nylon and then used in batch treatments similar to those described above using gel beads of cellulose ester material.

The superiority as adsorbent of cellulose acetate powder over a polyamide powder is illustrated in the following example.

EXAMPLE 6

The effectiveness of cellulose acetate powder and a polyamide powder (Polyclar AT) as adsorbent is demonstrated in terms of the removal of limonin from juice of low limonin content (8.6 ppm, barely detectably bitter); competition between limonin and flavonoids for adsorbent sites would be particularly strong in such juices. In this example, the serum of the juice was gently stirred for 45 minutes with the respective powders (72–200 mesh), using 0.20, 0.40, 0.80, 1.00, and 2.50 g/100 ml serum. The treatment with cellulose acetate powder reduced the limonin content to 5.0, 4.1, 3.1, 2.6 and 2.4 ppm, respectively; the treatment with polyamide powder reduced the limonin content to 7.4, 7.2, 6.7, 6.0 and 4.8 ppm, respectively.

In another technique for treating fruit juices, which is within the scope of this invention, juice is extracted in a conventional manner, then placed or stored in containers which are formed from, incorporate or are lined with a cellulose ester adsorbent such as a polymer gel or acetylated paper. Because the bitterness comes into the fresh juice within 24 hours, it will be adsorbed into the lining or treated material of the container as it enters the juice and the juice can be sold, without fear of being bitter, two or three days after it has been extracted from the oranges. In accordance with this aspect of the invention, the invention also provides a container for the handling and/or storage of fruit juices characterised in that it is formed from, incorporates or is lined with a cellulose ester adsorbent. This aspect of the invention is illustrated in the following examples

EXAMPLE 7

Cellulose acetate butyrate (5g) was dissolved in hot ethanol (40 ml). The hot mixture was poured into a one liter plastic bottle which was then rolled to give an even coating of gel on the internal walls of the bottle. When the gel had set, the bottle was soaked in water and rinsed repeatedly to remove the solvent. 500 ml of intensely bitter orange juice, which had been treated with limonin so that it contained 42 ppm limonin, was added to the container and the container stored under refrigeration. After three days, the juice was only slightly bitter, the limonin content being 11 ppm. It will be clear to those skilled in the art that this result demonstrates that normal bitter orange juice would be completely de-bittered by this process since natural orange juice with limonin contents in excess of 35 ppm is extremely rare.

EXAMPLE 8

Cellulose triacetate paper was prepared from Whatman Filter Paper No. 1 for Chromatography by the method of F. J. Ritter and J. Hartel (J. Chrom, 1, page 461 (1958).). Strips of this cellulose triacetate paper were used to line plain tin cans using "Araldite" as an adhesive. Can A was lined with 5.4g and can B with 7.8 g of the cellulose triacetate paper. Moderately bitter orange juice containing 14.9 ppm limonin was placed in both cans (420 ml each) and the cans were sealed and spin cooked in the usual way. The cans were stored under refrigeration. After four days, the juice in can A was only slightly bitter and contained 12.3 ppm limonin. The juice in can B was barely detectably bitter and contained 9.2 ppm limonin after 13 days.

We claim:

1. A method of removing limonin from citrus fruit juice which consists of contacting the fruit juice with at least one cellulose ester adsorbent in gel or powder form in the absence of, an added enzyme.

2. A method as claimed in claim 1, wherein the cellulose ester adsorbent comprises celluose acetate or cellulose acetate butyrate.

3. A method as claimed in claim 1, wherein the cellulose ester adsorbent is in gel bead form.

4. A method as claimed in claim 3, wherein the gel beads of cellulose ester adsorbent are packed in a column and the fruit juice is passed through the column.

5. A method as claimed in claim 1, wherein the cellulose ester adsorbent is in powder form.

6. A method as claimed in claim 5 wherein the serum of the fruit juice is separated from the other components thereof prior to contacting the serum with said adsorbent, and the adsorbent is subsequently separated from the treated serum before recombination of the treated serum with said other components.

7. A method according to claim 1 wherein the cellulose ester adsorbent comprises cellulose acetate or cellulose acetate butyrate in gel bead form.

8. A method according to claim 7 wherein the gel beads are packed in a column and the fruit juice is passed through the column.

9. A method according to claim 1 wherein the cellulose ester adsorbent comprises cellulose acetate or cellulose acetate butyrate in powder form.

10. A method according to claim 9 wherein the serum of the fruit juice is separated from the other components thereof prior to contacting the serum with said adsorbent, and the adsorbent is subsequently separated from the treated serum before recombination of the treated serum with said other components.

11. A method according to claim 1 wherein the fruit juice is whole citrus fruit juice.

12. A method according to claim 1 wherein the fruit juice is concentrated citrus fruit juice.

13. A method according to claim 1 wherein the fruit juice is whole fruit juice which has been further processed by dilution.

14. A method according to claim 1 wherein the cellulose ester adsorbent comprises cellulose acetate or cellulose acetate butyrate in gel bead form and the citrus fruit juice is Navel orange juice.

* * * * *